(12) United States Patent
Ae

(10) Patent No.: US 7,840,291 B2
(45) Date of Patent: Nov. 23, 2010

(54) DIGITAL RECORDER

(75) Inventor: Takahiro Ae, Hamamatsu (JP)

(73) Assignee: Roland Corporation, Shizuoka-ken, Hamamatsu (JP)

( * ) Notice: Subject to any disclaimer, the term of this patent is extended or adjusted under 35 U.S.C. 154(b) by 1001 days.

(21) Appl. No.: 11/639,444

(22) Filed: Dec. 14, 2006

(65) Prior Publication Data

US 2007/0162167 A1 Jul. 12, 2007

(30) Foreign Application Priority Data

Dec. 14, 2005 (JP) .............................. 2005-359714

(51) Int. Cl.
*G06F 17/00* (2006.01)
(52) U.S. Cl. ....................................................... 700/94
(58) Field of Classification Search ............... 700/94
See application file for complete search history.

(56) References Cited

U.S. PATENT DOCUMENTS 4,768,030 A * 8/1988 Frederich .................. 340/3.51

5,475,659 A * 12/1995 Aoki ........................ 369/24.01

FOREIGN PATENT DOCUMENTS

| JP | 2001-216765 | 8/2001 |
| JP | 2004-348921 | 12/2004 |

* cited by examiner

*Primary Examiner*—Andrew C Flanders
(74) *Attorney, Agent, or Firm*—Foley & Lardner LLP

(57) ABSTRACT

A recorder includes a processing device that runs numerous processes which include a process of inputting music sound stored in a storage device, a process of inputting music sound stored from the recording process in the storage device, a replay process which replays the musical sound stored in the storage device from that recording process. The recorder includes one or more switches and a scanning device that routinely detects the operating conditions of the one or more switches. A process is run from the processing device in response to the operating conditions of the switch detected by the scanning device. A control device can change the switch scan interval of the scanning device in response to that process.

15 Claims, 7 Drawing Sheets

Pattern Data

| Time |
|---|
| Note-on |
| Time |
| Note-on |
| |
| End Code |

FIG. 6

DIGITAL RECORDER

CROSS-REFERENCE TO RELATED PATENT APPLICATIONS

The present disclosure relates to the subject matter disclosed in Japanese patent application No. 2005-359714, filed on Dec. 14, 2005, which is incorporated herein by reference in its entirety and for all purposes

BACKGROUND OF THE INVENTION

The present invention relates generally to the field of recorders.

Previously, for a recorder to record or replay music, the recorder would detect the operating conditions of numerous switches of an operator and then run a process in response to those operating conditions. The operating conditions of the switch are detected from the scanning intervals. See Japanese Published Unexamined Application 2004-348921.

However, in previous recorders, the scan is run at a set interval and the scan creates noise. When the noise is recorded or replayed with the input musical sound, a problem of abrasive and jarring noise arises. For example, when the scan interval is 5 milliseconds, the noise level is at a frequency of 200 Hz, creating an abrasive noise. Consequently, when the scan interval is 50 milliseconds, the noise level frequency becomes 20 Hz, which is lower than the frequency audible to humans, does not create an abrasive noise. When the automatic performance data, such as a rhythm pattern, is created to perform in real time, if proper timing is not detected, the intended performance cannot be replayed.

As various processes are run with control equipment such as a Central Processing Unit (CPU), when the operating conditions of the switch are detected, and the scan interval for the switch is fast, processing occurs slower. When the processing slows down, a problem of not being able to properly detect the switch operations may occur.

Embodiments of the present invention relate to solutions to the above problems and allow the switch scan of the recorder to run at an appropriate interval.

SUMMARY OF THE DISCLOSURE

Embodiments of the invention provide for optimal interval for running a switch scan in a recorder.

One embodiment of a recorder includes a processing device that runs numerous processes which include a process for the input music sound stored in a storage device, a process for the input music sound stored from the recording process in the storage device, and a replay process which replays the musical sound stored in the storage device from that recording process. In that recorder embodiment, the recorder includes one or more switches and a scanning device that routinely detects the operating conditions of the one or more switches. A process is run from the processing device in response to the operating conditions of the detected switch from that scanning device. Also in that recorder embodiment, the recorder includes a control device that can change the switch scan interval of the scanning device in response to that process.

In accordance with the above embodiment, one or more switches and operating conditions of the one or more switches are detected sequentially by the scanning device. In response to the operating conditions of a switch detected by the scanning device; the process is run with the processing device. In response to the process, a control device changes the scan interval for the switch of the scanning device, enabling it to scan at an optimal interval in response to the process of the recorder.

In a further embodiment, the control device is set so that, when the record process is run according to the setting of the processing device, the scanning device scans the switch for other processes run at a comparatively slow rate (long interval). Accordingly, when recorder stores musical sound, the scan rate or interval is set to scan slowly, and the noise produced does not include a frequency range audible to humans, and the frequency is effectively changed so that it does not make a jarring or abrasive noise. When the recording process is running, the CPU control equipment takes time to run the processes. However, because the scan rate or interval for the switch is slow, the CPU control equipment is able to run the processes without interference.

In another embodiment, the control device is set so that, when the replay process is run according to the setting of the processing device, the scanning device scans the switch for other processes run at a comparatively slow rate (long interval). Accordingly, when the recorder replays music, the scan rate or interval is set to scan slowly, and the noise produced does not include a frequency range audible to humans, and the frequency is effectively changed so that it does not make a jarring or abrasive noise. When the recording and replaying process is running, the CPU control equipment takes time to run the processes. However, because the scan rate or interval for the switch is slow, the CPU control equipment is able to run the processes without interference.

In still another embodiment, the switch directs the creation of musical sound. The switch may be equipped with a time detection device that detects operation time. The processing device may be equipped with an automatic performance data formulation device that formulates performance data based on the detected time from the time detection device. From the automatic performance data formulation device, when the control device formulates the performance data in response to the operations of the switch, the scanning device scans the switch for other processes run at a comparatively fast rate (short interval). Because the scan rate or interval of the switch scanning device is set to run other processes comparatively quickly, when the recorder is formulated to perform automatic performance data in real time, the scan of the switch is relatively fast, which allows the automatic performance data to be formulated in proper timing.

BRIEF DESCRIPTION OF THE DRAWINGS

FIG. 6 is a diagram illustrating an example of formation data of a rhythm pattern according to an embodiment of the invention.

DETAILED DESCRIPTION

Figure 1:
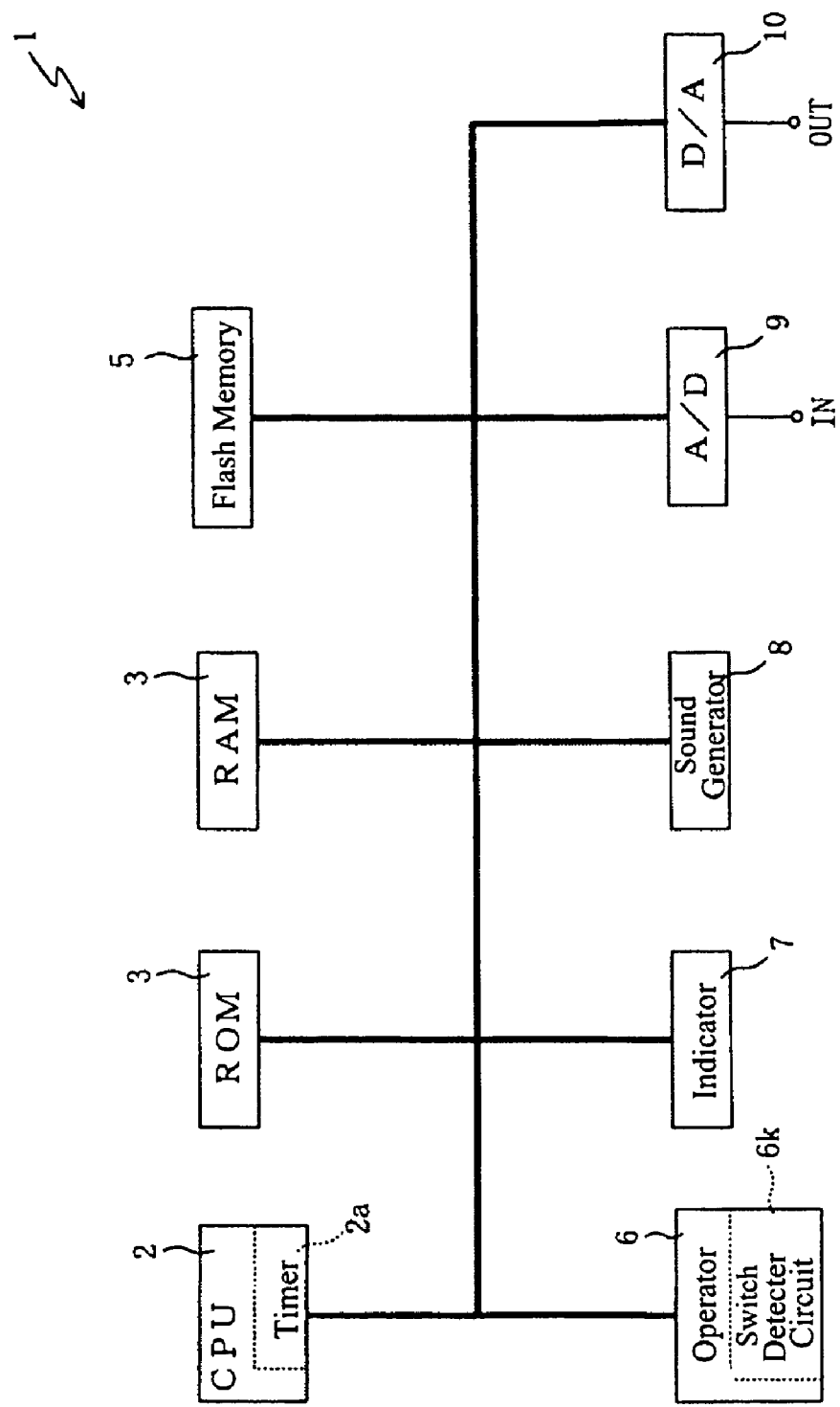
FIG. 1 is a block diagram illustrating electrical configurations of a recorder component of an embodiment of the invention.

FIG. 1 is a block diagram that illustrates an electrical configuration of a recorder 1 according to an embodiment of the invention. The recorder 1 is composed of a central processing unit (CPU) 2, a read-only memory (ROM) 3, a random access memory (RAM) 4, a storage device such as a flash memory 5, an operator 6, an indicator 7, a sound generator 8, an analog-to-digital (A/D) converter 9 and a digital-to-analog (D/A) converter 10. The various components may be connected together via a bus or other suitable connection scheme.

The CPU 2 is provided with a control program, which may run the performance equipment (not shown) in its entirety. As such, each control program and its processes run from the CPU 2 may refer to a fixed value data that is stored in the ROM 3. In the CPU 2, when automatic performance data is formulated from real-time performance, the automatic performance data is formulated in reference to the timing kept by an embedded timer 2a.

The RAM 4 is equipped with a work area that is used to for the CPU 2 to run each process in accordance with the stored control program in the ROM 3. The RAM 4 is also equipped with an area, as a temporary buffer, to store musical sounds when a musical sounds are read from the flash memory 5 or before the musical sounds are stored in the flash memory 5.

The flash memory 5 includes the memory for the musical sound and the rhythm pattern. The flash memory 5 (or other suitable memory) may be provided in a removable attachment module that is attachable to and removable from the recorder 1 and that can be written on and read from, when attached to the recorder 1, where information may remain stored, even when the power source is not available.

In one embodiment, this memory is configured to read in sets of blocks (i.e., 512 bytes) rather than 1 word at a time. This manner of reading, when compared to the access time of the RAM 4, requires a significantly longer period of time. For this reason, the RAM 4 is equipped with a temporary storage area so that, when reading information from the flash memory 5, the information can be written into the RAM 4 from the flash memory 5 beforehand. When writing into flash memory 5, information is configured to be temporarily written in RAM 4 and later written into flash memory 5.

Figure 2:
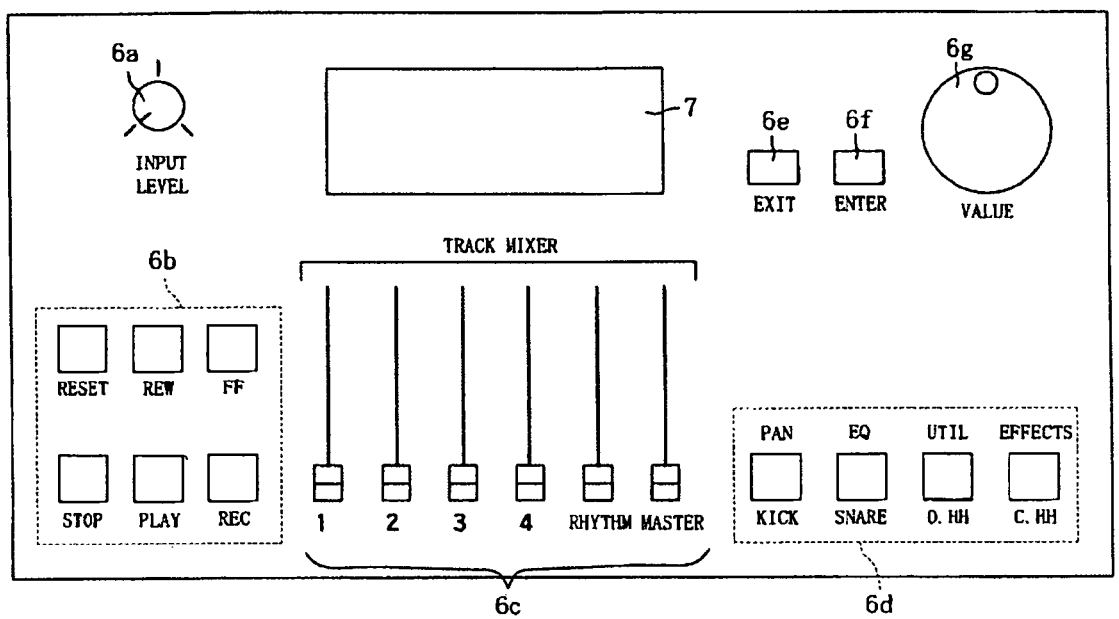
FIG. 2 is a panel diagram illustrating an embodiment of an operation panel of the recorder.

An embodiment of the operator 6 is described below with reference to FIG. 2. In the embodiment of FIG. 2, the operator 6 is composed of an operation panel for the recorder 1 which includes one or more switches that control various parameters, such as, but not limited to volume. The condition of the switches of the operator 6 is detected by the switch detector circuit 6k. An embodiment of the switch detector circuit 6k is described below with reference to FIG. 3. An indicator 7 displays the selected function (mode) and is configured to display the parameter values on a suitable display device, such as, but not limited to a liquid crystal display (LCD).

The sound generator 8 generates each type of rhythm sound, such as, but not limited to drums and cymbals, by pressing a switch on the operation panel, and a musical sound is created in response to the switch. This switch operation stores the information sequentially, enabling the storage of a rhythm pattern. The stored rhythm pattern is read sequentially, and can automatically perform rhythmic accompaniment.

Because the A/D converter 9 changes an analog signal to a digital signal, the analog electrical signal from a musical instrument, like a guitar or a vocal sound picked up on a microphone, is converted and input. That electrical signal prepares a set sampling frequency (e.g., 44.1 KHz) and quantifies a set bit number (e.g., 16 bit). This creates a digital signal, and the converted digital signal is temporarily stored in the temporary storage area of the RAM 4, and later stored in the flash memory 5.

Because the D/A converter 10 converts a digital signal to an analog signal, the digital signal stored in the flash memory 5 is read by the CPU 2. From the D/A converter 10, the converted analog signal is output from the recorder 1. The output analog signal is amplified by an amplifier (not shown), and the converted music is sounded through speakers or headphones, for example.

Next, with reference to FIG. 2, an embodiment of the operation panel of the recorder 1 is described. FIG. 2 is a diagram illustrating the operation panel of the operator 6 of recorder 1 according to an embodiment of the invention. In the operation panel of the recorder 1, a user uses the operator 6 to set the input level by directing the operation of six switches 6b, including volume (volume knob 6a), recording and replay. When mixing, the level of each channel is set by six slide volumes 6c, and the effect settings and the creation of a rhythm sound are directed by four switches 6d. Two switches 6e, 6f, a rotary encoder 6g, and the indicator 7 are used when operating in edit mode.

Input volume knob 6a adjusts the input electrical signal level, from devices such as, but not limited to a guitar or a microphone. The levels are displayed as a bar graph on the indicator 7, and appropriate value for the input level may be adjusted in reference to that display.

Record and replay operations are configured with six switches 6b: the reset switch (RESET) sets the replay position at the beginning of the recorded song; the rewind switch (REW) moves the replay position from the current position toward the beginning of the song; the fast forward switch (FF) moves the replay position from the current position towards the end of the song; the stop switch (STOP) directs a record or replay to stop; the play switch (PLAY) directs the replay to start from the replay position; and the record switch (REC) directs it to begin recording.

The six components of slide volume 6c are configured to adjust the various levels of track volume (tracks 1 through 4) on all four tracks when mixing various recorded performances, adjust the rhythm track volume (RHYTHM) which adjusts the automatic performance level of a rhythm pattern, mix the adjusted level from these five volumes, and adjust the master volume (MASTER) level when a recording is in progress.

Effect settings and the creation of rhythm sound are directed by four switches 6d. When edit mode is running or a rhythm pattern is created, functions are changed with a switch. When edit mode is running, the pan setting switch (PAN) sets the pan of each track (sound localization), the equalizer setting switch (EQ) sets the characteristics of the equalizer, the utility setting switch (UTIL) sets various functions, and the effects switch (EFFECTS) impacts the setting of the reverb. When a rhythm pattern is created, the four switches 6d become the rhythm sound switch group that directs the generation of sounds of the kick drum (KICK), snare drum (SNARE), open high hat (O.HH) and closed high hat (C.HH).

The two switches 6e and 6f are configured as the exit switch (EXIT) which returns to the previous operation or cancels the operation in use, and the enter switch (ENTER) which properly directs selection and the setting of numerous values.

The rotary encoder 6g selects the mode of the recorder 1, selects an item from various selection items, sets the parameter value and converts it. The indicator 7 displays the selected item and the parameter value.

Now, the basic operations of the configured recorder 1 according to an embodiment of the invention will be described with reference to FIGS. 1 and 2. In the recorder 1, with the power source input from the flash memory 5, the set song is transmitted to the RAM 4, and replay mode becomes possible. In this condition, it is possible to select any mode. Modes include record, replay, edit, rhythm pattern creation and others. An overdubbing function may enable new sound to be re-recorded as the recorded track replays a musical sound.

When the play switch of the switches 6b is pressed, a replay condition is activated. The song data stored in the RAM 4 is read sequentially, and the changed analog signal from the D/A Converter 10 is output. At the time of replay, when the stop switch of the switches 6b is activated, replay is stopped. When the reset switch is activated, the replay position is moved to the beginning of the song. When the rewind switch is activated, the replay position is moved from the current position towards the beginning of the song. When the fast forward switch is activated, the replay position is moved from the current position towards the end of the song.

Regarding the condition in which the replay is stopped, when the record switch is activated, the record function is selected. In this condition, it is set up for the input music sound from any of the 4 tracks selected for recording. Input volume 6a is adjusted, and the input level is set. The setting of the input musical sound can provide a functional advantage.

Furthermore, it is possible to record on a separate track as one track is replayed. In this regard, after recording preparations are complete, when the play switch is activated, the recording begins. The recorded music is converted to a digital signal by the A/D Converter 9 and stored with the RAM 4. When the recording is stopped, it activates the stop switch. Replay is possible when a recording is stopped.

In the Edit mode, the utility switch is activated and the rotary encoder 6g is selected and operated from the menu displayed by the indicator 7. When the edit mode is selected, many different tracks can be edited to re-record the mixing of the recorded musical sounds onto one track.

In the rhythm pattern creation mode, the utility switch is operated in a similar fashion and the rotary encoder is selected and operated from the menu displayed on the indicator 7. When this rhythm pattern creation mode is selected, four switches 6d direct the production of a rhythm sound. When the play switch is activated, the created rhythm pattern begins to play. Once that happens, the tempo and beat are set, a metronome sound is produced, and a rhythm pattern is created from the operation of the four switches 6d, in step with the metronome sound.

The created rhythm pattern is stored in the flash memory 5 in the same manner as the musical sound. When a new musical sound is recorded, a rhythm pattern is replayed at a set tempo. While an instrument is performing, it is possible to listen to the rhythm performance, while that performance sound can be stored.

Figure 3:
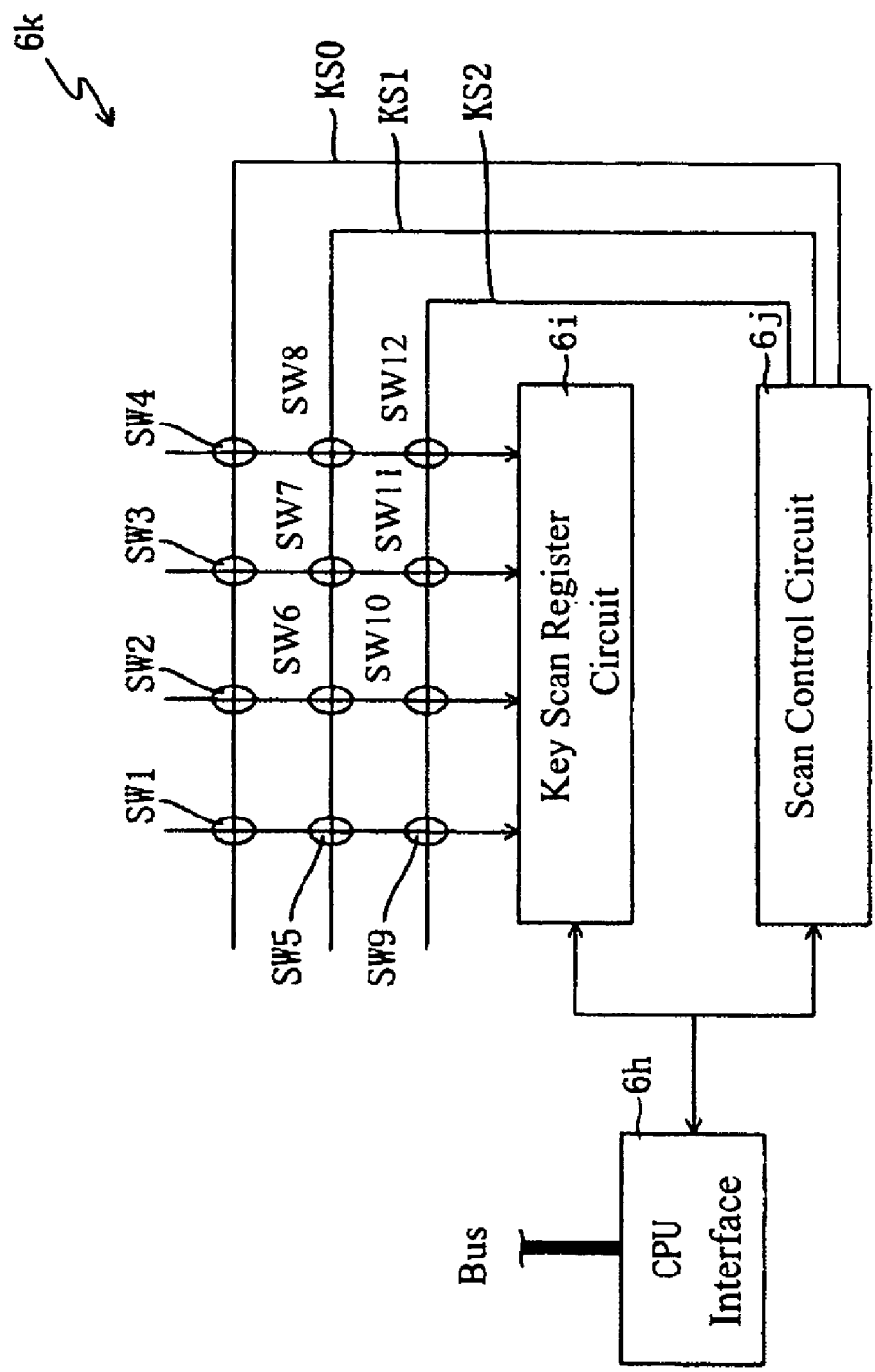
FIG. 3 is a block diagram of the electrical configuration of an embodiment of a switch detection circuit that runs a switch scan.

Next, with reference to FIG. 3, an operation of a switch detection circuit 6k according to an embodiment of the invention will be described. The switch detection circuit 6k detects the operational conditions of the numerous switches configured in the operation panel illustrated in FIG. 2. FIG. 3 is a block diagram illustrating an embodiment of the switch detection circuit 6k. Components of the switch detection circuit 6k include twelve switches (SW1 through SW12), a CPU interface 6h, a key scan register circuit 6i and a scan control circuit 6j.

The twelve switches are the switches configured in the operation panel described above with reference to FIG. 2, arranged in a matrix of 4 rows and 3 columns. The electrode at one end of each switch in each column is arranged with a common connection and connected to three key strobe signals (KS0 through KS2) that are generated from the scan control circuit 6j. The electrode at the other end of each switch in each row is arranged with a common connection and input to the key scan register circuit 6i. When the key strobe signal is generated, the key scan register circuit 6i reads the switch conditions in column that is detected by that key strobe signal, and transfers that data to the CPU interface 6h.

The CPU interface 6h is connected to the CPU 2 via a bus. The CPU interface 6h transfers the data that indicates the switch conditions that are acquired by the key scan register circuit 6i to CPU 2.

Based on scan interval data, the scan control circuit 6j, including a timer (not shown), sequentially produces a key strobe signal. Scan interval is configured to produce a repeating strobe signal from 5 milliseconds to 50 milliseconds, in KS1, KS1, KS2 order.

Figure 4:
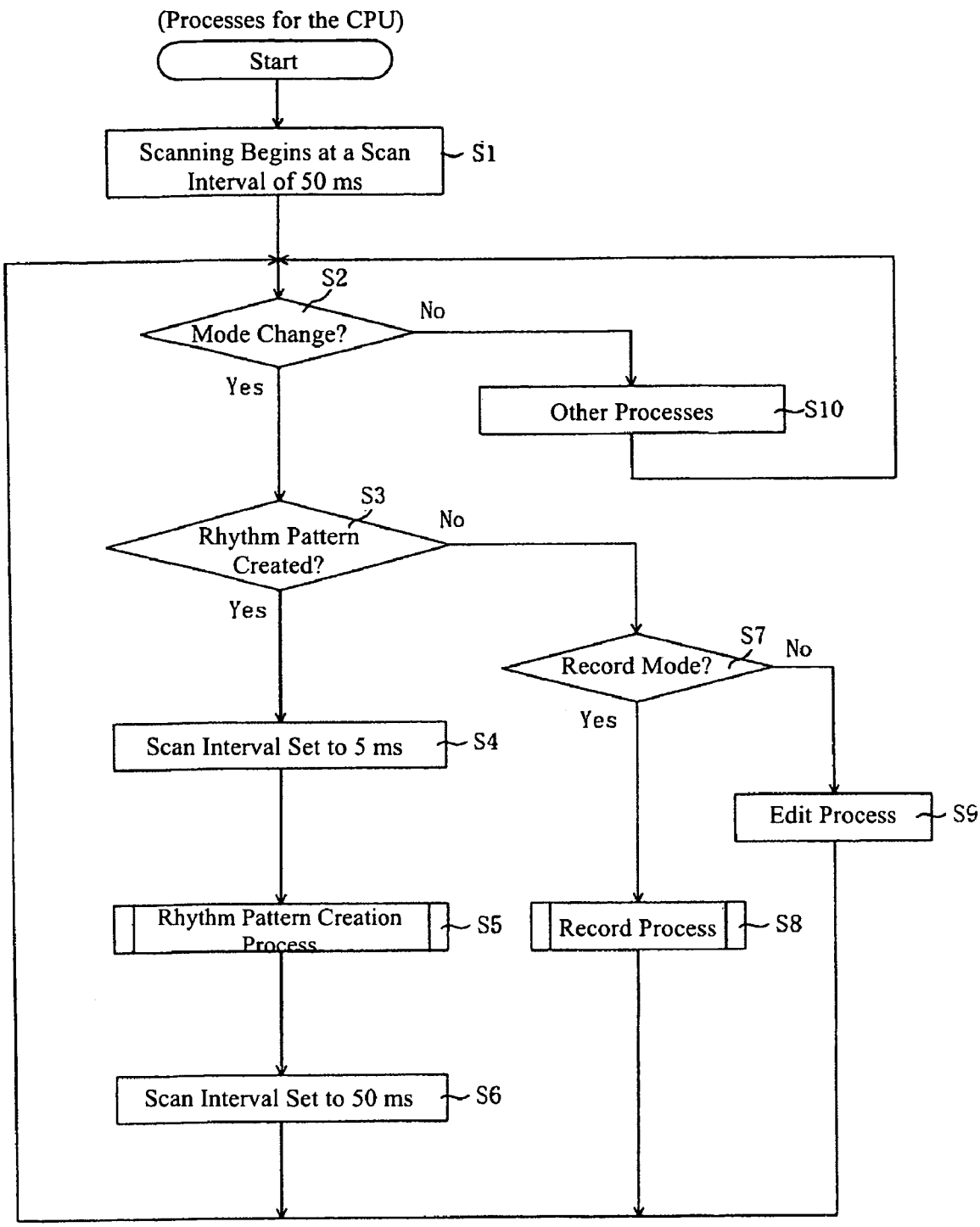
FIG. 4 is a flowchart illustrating an example of main processes according to an embodiment of the invention.

Next, with reference to FIGS. 4 through 7, example operating processes of the CPU 2 in the recorder 1 according to an embodiment of the invention are described. FIG. 4 is a flowchart illustrating one embodiment of the main processes of the CPU 2. Once the power source of the recorder 1 is input and activated, it runs repeatedly until the power source is interrupted. First, the initial settings are sent to the CPU interface 6h and the scan interval for the switch of the scan control circuit 6j is set to 50 milliseconds (S1). As described above, in this condition, there is a replay mode, and it is possible to change the mode.

Next, the user decides whether to change from replay mode to a different mode (S2). If a mode change is detected (S2: Yes), it is determined whether or not that changed mode is in rhythm pattern creation mode (S3). When the changed mode is in rhythm creation mode (S3: Yes), the scan interval of the switch changes to 5 milliseconds under the direction sent to the CPU interface 6h (S4), and the rhythm pattern creation process is performed (S5). One embodiment of the rhythm pattern creation process is described below with reference to FIG. 5. When the rhythm pattern creation process is complete, the scan interval of the switch is changed to 50 milliseconds under the direction sent to the CPU interface 6h (S6), and the main process returns to the S2 step.

In the S3 decision step, if the changed mode is not the rhythm pattern creation process (S3: No), it is determined whether or not the changed mode is record mode (S7). If the changed mode is record mode (S7: Yes), the recording process runs (S8). An embodiment of the recording process is described below with reference to FIG. 7.

In the S7 decision step, if the changed mode is not record mode (S7: No), the edit process will run (S9). When the recording process or the edit process is complete, the main process returns to the S2 step.

In the S2 decision step, when a mode change is not detected (S2: No), because it is in replay mode when the play switch is activated, the selected song begins playing again (S10) and the main process returns to the S2 step.

Figure 5:
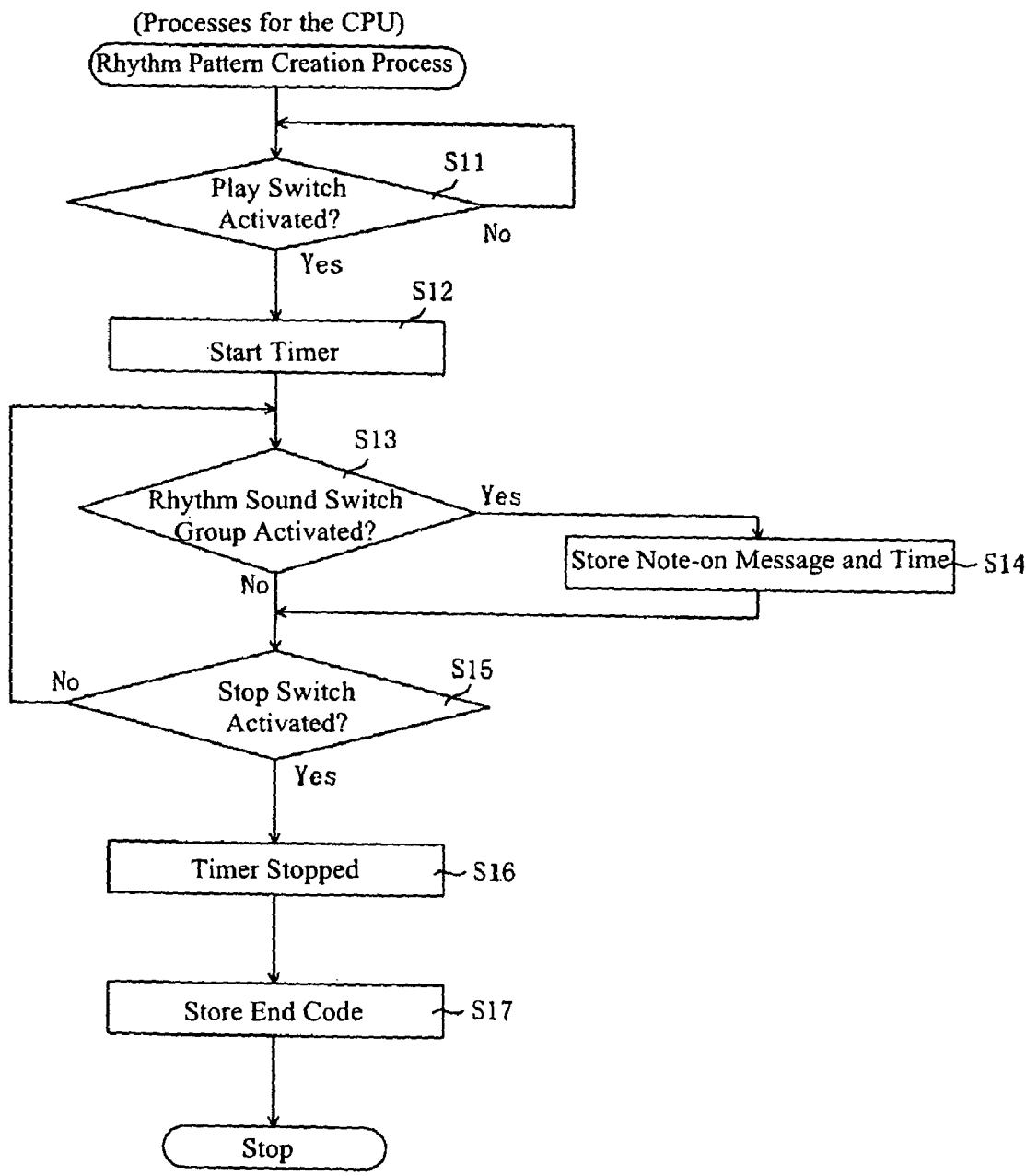
FIG. 5 is a flowchart illustrating a rhythm pattern creation process according to an embodiment of the invention.

Next, with reference to FIGS. 5 and 6, a rhythm pattern creation process according to an embodiment of the invention is described. FIG. 5 is a flowchart illustrating one embodiment of a rhythm pattern creation process. FIG. 6 exemplarily illustrates the data formation of rhythm patterns. In a rhythm pattern creation process, the user utilizes the metronome (not shown); the metronome creates a rhythm sound that sets the tempo and beat. At step S11, it is determined whether or not the play switch is activated. When the play switch is not activated (S11: No), the rhythm pattern creation process waits until the play switch is activated. When the play switch is activated (S11: Yes), the timer is set to begin (S12). The timer registers the time unit in response to the set tempo value. When it is replayed, the tempo value is able to be changed.

Next, it is determined whether or not any of the four switches 6d in the rhythm sound switch group are activated to create rhythm sound (S13). As mentioned above, in rhythm pattern creation mode, the switch scan interval is set to 5 milliseconds. In this switch operating condition, it is input into the CPU 2 via the CPU interface 6h.

If any of the switches are activated (S13: Yes), the note-on message corresponding to the activated switch and the time registered by the timer are stored in the set area for the RAM 4 (S14). A note-on message combines the communication specifications of electronic musical instruments and personal computers, and the information is set from the MIDI specification. A note-on message directs to start the musical sound of the instrument, and includes a note number corresponding to that rhythm instrument and velocity data that indicates the operation strength. The velocity has a set value.

In the S13 decision step, if the operator 6 is not activated (S13: No) or, if the S14 process is complete, the process determines whether or not the stop switch is activated (S15). If the stop switch is not activated (S15: No), the process returns to the S13 step. If the stop switch is activated (S15: Yes), the timer is set to register the stop (S16). The end code that indicates the end of data is recorded at the end of the performance data of the rhythm pattern that is stored until that time in the RAM 4 (S17), and this rhythm pattern creation process is complete.

As exemplarily shown in FIG. 6, the rhythm pattern is composed of the pairs of the operated time of the switch and the note-on message sequentially, and the end code is recorded at the end of the rhythm pattern.

Figure 7:
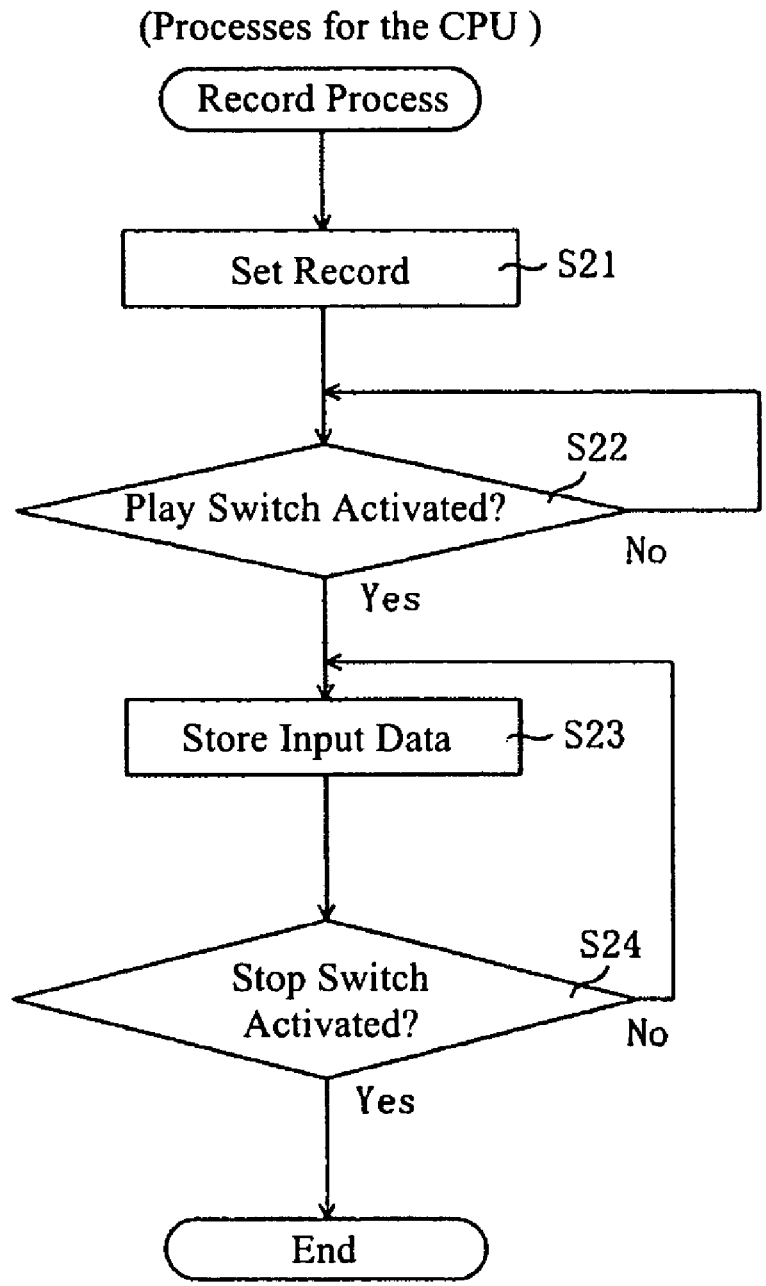
FIG. 7 is a flowchart illustrating a recording process according to an embodiment of the invention.

Next, with reference to FIG. 7, the recording process in record mode according to an embodiment of the invention will be described. FIG. 7 is a flowchart illustrating an embodiment of the recording process according to an embodiment of the invention. In the recording process, the sampling frequency, the quantum bit number, the types of effects, parameter value effects and the input levels are set (S21). It is determined whether or not the play switch that directs the start is activated (S22). If the play switch is not activated (S22: No), the process waits until the play switch is activated. If the play switch is activated (S22: Yes), the input musical sound of the digital signal converted by the A/D Converter 9 is stored in the set area of the RAM 4 (S23). Next, it is determined whether or not the stop switch is activated (S24). If the stop switch is not activated (S24: No), the process returns to the S23 step. If the stop switch is activated (S24: Yes), the recording process is stopped.

Like the above explanation of the embodiment of the invention, when the input musical sound is recorded or when the recorded musical sound is replayed, because the switch is scanned at a 50-millisecond interval, the noise generated from the switch scan becomes 20 Hz, not causing a harsh agitating sound. Furthermore, when the record or replay processes are run, the processes run by the CPU control equipment take time. However, if the scan interval of the switch is slow, it does not interfere with these processes.

On the other hand, when a rhythm pattern is created, because the switch scans at a 5-millisecond interval, the time that passes during the switch operation can be recorded well. When a rhythm pattern is created, the generated noise at 200 Hz is a little abrasive sounding; however, this noise is not recorded and does not cause a problem.

For this reason, in response to the processes of the recorder, the scan interval of the switch is set and the performance of the CPU control equipment can be raised appropriately.

In one embodiment, the S4 and S6 steps displayed in the flowchart of FIG. 4 may correspond to the functions of a control device. Similarly, the S14 step displayed in the flowchart of FIG. 5 may correspond to the functions of a time detection device.

A basic working example of this invention has been explained above; however, this invention is not limited in any way by the above specific examples. Various improvements, alternatives and modifications of the above-described examples are contemplated to be within the scope of this invention.

For example, in the above described embodiments, in response to one of the many modes, such as replay mode, record mode, or rhythm pattern creation mode, it is possible to change only the scan interval of the switch. However, in further embodiments, it is also possible that, in response to the mode, for only the switch or switches used in that mode to be scanned.

While particular embodiments of the present invention have been disclosed, it is to be understood that various different modifications and combinations are possible and are contemplated within the true spirit and scope of the appended claims. There is no intention, therefore, to limit the invention to the exact abstract and disclosure herein presented.

What is claimed is:

1. A recorder, comprising:
    a storage device for storing input music sound, the input music sound being adapted to be stored on the storage device through a recording process and to be replayed through a replay process;
    one or more switches;
    a scanning device for detecting cyclically an operating condition of the switches;
    a processing device adapted to operate in response to the operating conditions of the one or more switches detected by the scanning device, operation of the processing device including the recording process and/or the replay process; and
    a control device adapted to sequentially produce strobe signals to the one or more switches, the control device adapted to change a scan interval of the one or more switches in the scanning device, in response to the operation of the processing device, by changing an interval at which the control device sequentially produces the strobe signals to the one or more switches.

2. The recorder according to claim 1, wherein, the control device is configured such that, when the operation of the processing device is the recording process, the scanning device is controlled to scan the one or more switches for other processes run at a comparatively slow cycle.

3. The recorder according to claim 1, wherein, the control device is configured such that, when the operation of the processing device is the replay process, the scanning device is controlled to scan the one or more switches for other processes run at a comparatively slow cycle.

4. A recorder, comprising:
    a storage device for storing input music sound, the input music sound being adapted to be stored on the storage device through a recording process and to be replayed through a replay process;
    one or more switches;
    a scanning device for detecting cyclically an operating condition of the one or more switches;

a processing device adapted to operate in response to the operating conditions of the one or more switches detected by the scanning device, operation of the processing device including the recording process and/or the replay process;

a control device adapted to change a scan interval of the one or more switches in the scanning device, in response to the operation of the processing device;

a time detection device that detects operation time of the one or more switches; and an automatic performance data formulation device adapted to use times detected by the time detection device to formulate performance data;

wherein the one or more switches are adapted to direct creation of musical sound; and wherein the control device is configured such that, when the automatic performance data formulation device formulates the performance data in response to operations of the one or more switches, the scanning device is controlled to scan the one or more switches for other processes run at a comparatively fast cycle.

5. A method of operating a recorder, comprising:

a) scanning operating conditions of one or more switches at a first scan interval, the operating conditions of the one or more switches being indicative of an operation being run by the recorder;

b) determining which operation is being run by the recorder based on the scanning;

c) determining whether the first scan interval of the scanning requires altering based on the operation being run by the recorder; and d) changing the first scan interval to a second scan interval, by changing an interval at which the strobe signals are sequentially produced to the one or more switches, when step c) determines the operation being run by the recorder requires altering the first scan interval.

6. The method of claim 5, wherein step b) includes detecting a change in the operating conditions of one or more switches.

7. The method of claim 5, wherein the operation being run by the recorder is a record process, an edit process, a replay process, or a rhythm pattern creation process.

8. A recorder, comprising:

one or more switches, operating conditions of the one or more switches corresponding to an operation run by the recorder;

a switch scanning device adapted to scan the operating conditions of the one or more switches at a first scan interval;

a processing device adapted to determine which operation is being run by the recorder based on scanning of the switches by the switch scanning device, the processing device being further adapted to determine whether the first scan interval of the switch scanning device requires altering based on the operation being run by the recorder; and a control device adapted to sequentially produce strobe signals to the one or more switches, the control device adapted to change the first scan interval to a second scan interval, by changing an interval at which the control device sequentially produces the strobe signals to the one or more switches, when the processing device determines the operation being run by the recorder requires altering the first scan interval.

9. The recorder of claim 8, wherein step the processing device is adapted to determine which operation is being run by the recorder by detecting a change in the operating conditions of the one or more switches.

10. The recorder of claim 8, wherein the operation being run by the recorder is a record process, an edit process, a replay process, or a rhythm pattern creation process.

11. The recorder of claim 1, wherein the control device is adapted to change the scan interval from a first interval to a second interval.

12. The recorder of claim 11, wherein the first scan interval has a magnitude different from a magnitude of the second scan interval.

13. The recorder of claim 12, wherein the magnitude of the first scan interval is larger than the magnitude of the second scan interval.

14. The recorder of claim 5, wherein the first scan interval has a magnitude different from a magnitude of the second scan interval.

15. The recorder of claim 8, wherein the first scan interval has a magnitude different from a magnitude of the second scan interval.

* * * * *